F. S. RADACK.
TRANSFERRING MECHANISM FOR FILLING AND CAPPING MACHINES.
APPLICATION FILED JAN. 27, 1912.
1,047,288. Patented Dec. 17, 1912.
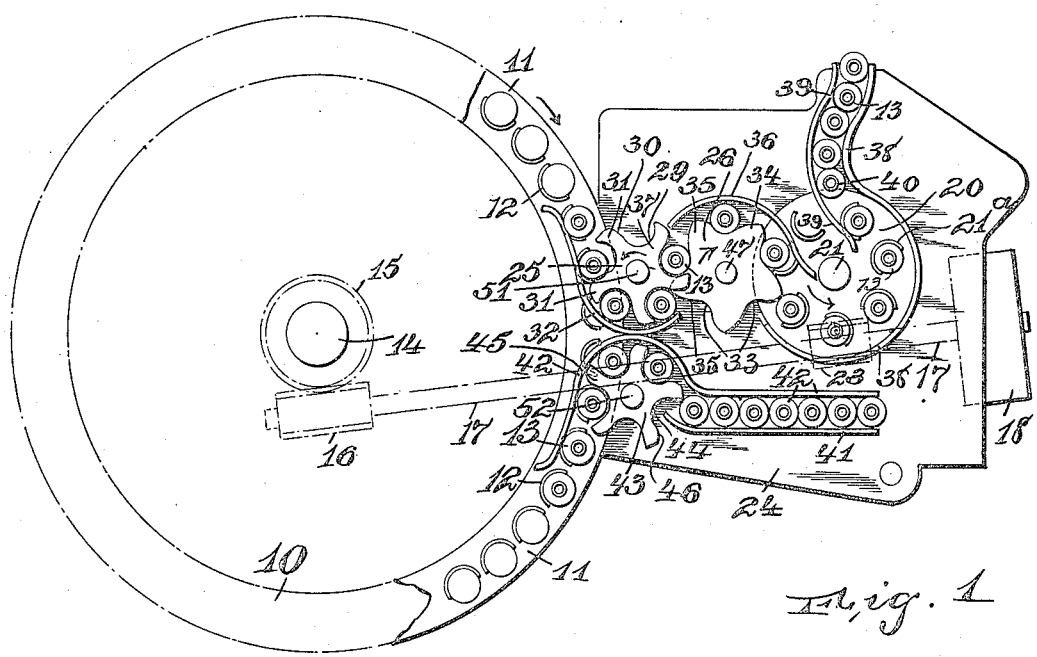
Fig. 1
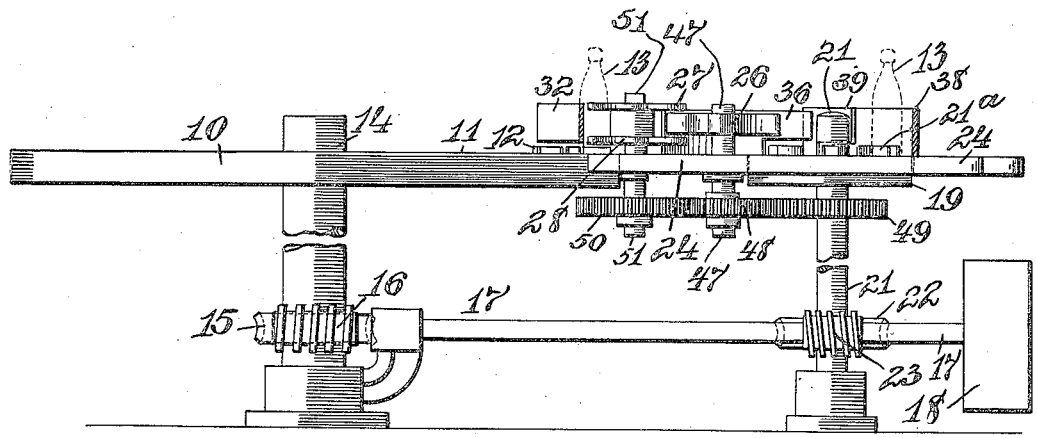
Fig. 2
Fig. 3
WITNESSES:
M. A. Johnson
Albert Wey
INVENTOR
Frank S. Radack,
BY
Wm H Caufield.
ATTORNEY

UNITED STATES PATENT OFFICE.

FRANK S. RADACK, OF NEWARK, NEW JERSEY.

TRANSFERRING MECHANISM FOR FILLING AND CAPPING MACHINES.

1,047,288.  Specification of Letters Patent.  Patented Dec. 17, 1912.

Application filed January 27, 1912. Serial No. 673,745.

*To all whom it may concern:*

Be it known that I, FRANK S. RADACK, a citizen of the United States, residing at Newark, in the county of Essex and State of New Jersey, have invented certain new and useful Improvements in Transferring Mechanism for Filling and Capping Machines; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to an improved means for feeding bottles and embraces a device for feeding the bottles to a bottling machine, the bottling machine being of the rotary type, which machine receives the bottles along its periphery, that is, in a circumferential disposition and fills them while they are rotating, combined with a rotary capping machine that rotates the bottles in the capping operation, the bottles being transferred by my improved device from the bottling machine to the capping machine.

The invention is illustrated in the accompanying drawing, in which—

Figure 1 is a top view of a rotary machine and a rotary platform, these being shown only so far as their receptacle portions are concerned and the driving apparatus therefor. Fig. 2 is a side view of Fig. 1 with the run-way and the feeding wheel removed to better illustrate the propelling wheels, and Fig. 3 is a detail showing the driving connection between the propelling wheels and the feeding wheel.

I illustrate in the drawing a bottling machine 10. On the circumferential rim or otherwise circumferentially disposed bottle holding portion 11 are the clips 12 which are open at one side, as is usual with machines of this type, to receive bottles 13 and hold them during the filling operation which takes place while the machine is being revolved. The machine is revolved through its shaft 14 being turned by a worm-gear 15 operated by a worm 16 on a drive-shaft 17 which is operated by a pulley 18. I do not wish to be understood as being limited to this particular driving mechanism. The bottle holding portion 11 is smooth outside of the clips, that is, between the clips and the edge of the machine, so that the bottles can slide into the clips with a radial or tangential movement. The bottle capping machine 19 has its rotary platform 20 provided with clips 21ª, which clips rotate with the rotary platform or bottle holding portion, the open side of the clips facing in a direction tangential to the bottle holding surface 20 for reasons to be described hereinafter. The bottle holding portion 20 rotates on a shaft 21 which is driven by means of a worm-gear 22 and a worm 23, which worm is mounted on the shaft 17. I prefer to make the top of the bottle holding surface of both machines flush.

I arrange a fixed platform 24 so that it bridges the space between the capping machine and the bottling machine so that bottles can be slid across from one machine to the other. Mounted on the platform are the propelling wheels 25 and 26 overlapping each other and overlapping the machines insofar as their bottle holding portions are concerned. The propelling wheel 25 consists of two disks 27 and 28 which are separated to permit the rotation of the wheel 26 between them. These disks on the wheel 25 are recessed as at 29, the wall of the recess on one side merging as at 30 into the periphery of the wheel so as to give a rolling surface, as the projections 31 of the wheel pass in between the bottles as shown in Fig. 1. The propelling wheel 25 embraces the bottles successively that are in the clips 12 and swing them around out of the clips 12, the bottles during their exit bearing on the wall 32 which extends from the platform across the path of the bottles, being cut away underneath to permit the passage of the clips as shown in Fig. 2. The propelling wheel 26 is provided with recesses 33, which recesses are separated by their projecting arms 34 which are substantially radial, one wall however, as 35, being on a longer radius than the other wall so as to provide a rolling surface for receiving the bottles from the propelling wheel 25. The propelling wheels are so arranged that they are in cadence or in time to bring their recesses in register to receive the bottles one from the other, and also in time with the bottling machine and the capping machine, the wheel 26 transferring its bottles successively to the clips 21ª of the capping machine as illustrated in Fig. 1. A wall 36 is arranged circumferentially to the propelling wheel 26 to receive the bottles and guide them to prevent their radial movement in relation to the wheel 26, and maintaining the bottles against such movement until they are seated in the clips 21ª.

A trough extends from the capping machine, the trough consisting of a wall 38 and a second wall 39, which second wall extends in the path of travel of the bottles on the capping machine and is cut away at the bottom to permit the clips 21ª to pass underneath, but extends in the path of the bottles to engage the bottles successively, each of the bottles passing from its clip and engaging the wall 39, the clip having its open side arranged tangential to permit the sliding of the bottle from it. The next succeeding clip engages this bottle and slides it along the wall 39 which is inclined to the path of travel of the bottle, that is, it is tangential to the bottle holding surface 20 and the preceding bottle is moved by each clip to the position shown at 40 in Fig. 1.

To feed the bottles I provide a run-way 41, one wall 42 of which extends around a feeding wheel 43 to a point inside the clips 12 as shown in Fig. 1. The feeding wheel 43 has recesses 44 which are separated by the projections 45 with a curved wall 46 on each recess to provide for the rolling of the wall on the bottle when the bottle leaves the feeding wheel. This feeding wheel places the bottle from the run-way into the clips of the bottling machine, the feeding of the bottles through the run-way 41 being provided by any means suitable for the purpose.

The propelling wheel 26 is mounted on a shaft 47 which is driven by means of a gear-wheel 48 on the shaft 47 which is in mesh with a gear-wheel 49 on the shaft 21. From this gear-wheel 48 is driven a gear-wheel 50 mounted on a shaft 51 on which shaft 51 is placed the propelling wheel 25. The feeding wheel 43 is on a shaft 52 having a gear 53 thereon, which gear-wheel is driven from an idle gear 54 supported on the platform 24, the gear-wheel 54 being in mesh with the gear-wheel 51.

The gearing above described provides for the proper rotation of the propelling wheels and the feeding wheel so as to maintain the rate of travel of the bottles in order that they may be seated at the proper times in their respective bottle holding clips in the different machines.

The combination of the bottle filling machine and the bottle capping machine driven together and in cadence with the propelling wheels and the feeding wheel provides for a compact and simple transfer of bottles across a fixed platform, the surface of which is flush with the bottle holding surfaces of the machine, and the slipping of the bottles, which are usually moist and wet, is easy and steady and there is no loss of material from the bottles, and the bottles are passed across so quickly that the contents loses none of its strength and is not altered by a long contact with the air.

Having thus described my invention, what I claim is:—

1. The combination of a rotary machine with successive holding clips and a rotary platform with holding clips, with a fixed platform connecting the machines, rotary propelling wheels above the platform and overlapping the clips and also each other, the wheels having recesses to receive bottles, guiding walls adjacent to the wheels for preventing radial movement of the bottles, and mechanism for operating the machines and wheels in proper cadence.

2. The combination of a rotary machine with successive holding clips and a rotary platform with holding clips, with a fixed platform connecting the machines, rotary propelling wheels above the platform and overlapping the clips and also each other, the wheels having recesses to receive bottles, guiding walls adjacent to the wheels for preventing radial movement of the bottles, and a trough with one wall in the path of the bottles in the rotary platform and coöperating with the clips of the said machine for feeding bottles from the machine through the trough.

3. The combination of a rotary machine with circumferentially disposed holding clips and a rotary platform with circumferentially arranged holding clips, with a fixed platform between the machine and the rotary platform and joining their circumferences, propelling wheels having bottle holding recesses, the propelling wheels overlapping each other with their recesses adapted to register, the wheels overlapping the clips of the machines with their recesses adapted to come in register with the clips of the machines, means for operating the propelling wheels in the proper cadence with the machines, and a trough with one wall overlapping the clips of the rotary platform, the clips of the rotary platform being arranged with an open side to permit the exit of the bottle from the clip when the bottle engages the projecting wall of the trough, the succeeding clip having its closed side acting to force the preceding bottle along the wall of the trough.

4. The combination of a rotary machine having clips for holding receptacles, a fixed platform adjacent thereto, a rotary platform in the fixed platform, clips on the rotary platform, a propelling wheel comprising two parallel horizontal disks with alined recesses to come in register with clips of the machine, a second propelling wheel having projecting arms with curved walls to form recesses between them, the arms rotating between the disks of the first propelling wheel so as to overlap it, the second propelling wheel also overlapping the rotary platform so that its recesses come in register with the clips of the rotary platform, and a trough with one wall curved and overlapping the clips of the rotary platform, the clips having open sides to permit the release of receptacles in the clips by the trough, the closed sides of the clips being arranged to engage the preceding receptacle to move it along the trough.

5. The combination of a rotary machine having clips for holding receptacles, a fixed platform adjacent thereto, a rotary platform in the fixed platform, clips on the rotary platform, a propelling wheel comprising two parallel horizontal disks with alined recesses to come in register with clips of the machine, a second propelling wheel having projecting arms with curved walls to form recesses between them, the arms rotating between the disks of the first propelling wheel so as to overlap it, the second propelling wheel also overlapping the rotary platform so that its recesses come in register with the clips of the rotary platform, a wall overlapping the clips of the rotary machine and extending concentric to the first propelling wheel, a wall concentric to the second propelling wheel and extending over the clips of the rotary platform, and a trough with one wall curved and overlapping the clips of the rotary platform, the clips having open sides to permit the release of receptacles in the clips by the trough, the closed sides of the clips being arranged to engage the preceding receptacle to move it along the trough.

In testimony, that I claim the foregoing, I have hereunto set my hand this twenty-second (22) day of January, 1912.

FRANK S. RADACK.

Witnesses:
   J. F. WERNER,
   GEORGE F. VANCLEAVE.